March 13, 1928.
C. C. CARTER
NECK YOKE
Filed March 5, 1927
1,662,737
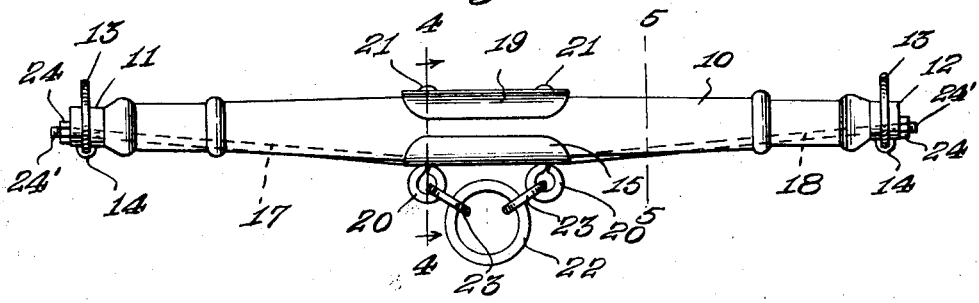
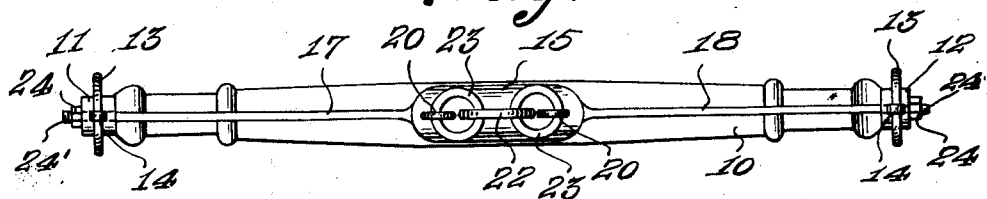
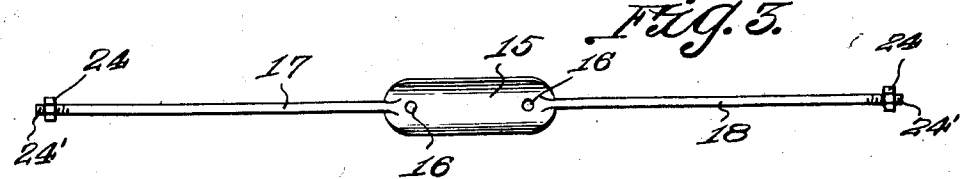
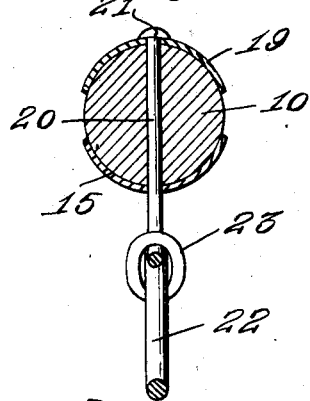
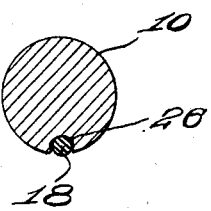
C. C. Carter, INVENTOR
Victor J. Evans, ATTORNEY
WITNESS:

Patented Mar. 13, 1928.

1,662,737

UNITED STATES PATENT OFFICE.

CARROLL C. CARTER, OF CAIRO, ILLINOIS.

NECK YOKE.

Application filed March 5, 1927. Serial No. 173,118.

The object of this invention is to provide a neck yoke or the like, braced in a particular manner by a reinforcing device, and to provide means for retaining the end ferrules of the yoke or similar article.

A further object is to provide a truss extending longitudinally of the yoke and including a central plate member adapted for connection with the central portion of the yoke per se, usually formed of wood, said truss passing thru the end ferrules and being further retained against longitudinal movement.

Another object is to embed or partly embed the truss in a longitudinal groove or grooves of the yoke.

With the foregoing and other objects in view, the invention consists in the novel construction and arrangement of elements described, illustrated and claimed, it being understood that modifications may be made within the scope of the claims without departing from the spirit of the invention.

In the drawings forming part of this application,

Figure 1 is a view of the yoke in elevation.

Figure 2 is a bottom plan view.

Figure 3 shows the truss member detached.

Figure 4 is a section on line 4—4 of Figure 1.

Figure 5 is a section on line 5—5 of Figure 1.

A yoke 10, usually formed of wood, carries end ferrules such as 11 and 12, and the truss referred to below passes thru these ferrules, serving the purpose indicated below. Connecting devices such as 13 pass thru eye members 14, and serve the usual purpose.

The yoke is braced by means of a truss, shown in detail in Figure 3, and including a central plate portion 15, having bolt holes 16, this plate being formed as a part of the end portions 17 and 18 of the truss. The plate 15 is concave on the inner side, as will be observed from an inspection of Figure 4, and an oppositely located plate 19 is provided with bolt holes for the accommodation of eye bolts 20, headed or otherwise secured at 21.

A centrally located annular member, or other suitable connecting device is designated 22, and is attached to the eye portion of bolts 20 by means of rings or links 23.

The feature of prime importance is the truss of Figure 3, and the mounting thereof, the retaining devices including end nuts or other securing members such as 24 serving to engage the threaded portions 24' at the ends of elements 17 and 18. These portions 17 and 18 of the truss pass thru the end ferrules, as stated, and are secured in the manner indicated, thereby providing an especially good mechanical connection, both so far as the truss and the ferrules are concerned.

The truss, and more especially the elements 17 and 18 thereof are accommodated by grooves or channels, shown in Figure 5, and designated 26, these channels being of any suitable depth, as will be apparent from an inspection of Figure 1, in which the dotted lines show the position of the members 17 and 18 with reference to the wooden structure 10.

The yoke, independently of the special construction disclosed, is of substantially standard form, but the usual lower plate is omitted, and the special plate, formed as a part of the truss, is substituted,—grooves being provided as indicated.

Having described the invention what is claimed is:—

A device of the class described, comprising an elongated member having longitudinal channels therein, a truss including a central plate member and laterally extending arms, the arms resting in the channels, means connecting the plate member with the elongated element, the central portion of the plate and the adjacent portions of the arms merging in approximately the same plane at the points where the arms enter the channels and means connecting the arms, at their ends, with the end portions of the elongated member.

In testimony whereof I affix my signature.

CARROLL C. CARTER.